2,986,441
Patented May 30, 1961

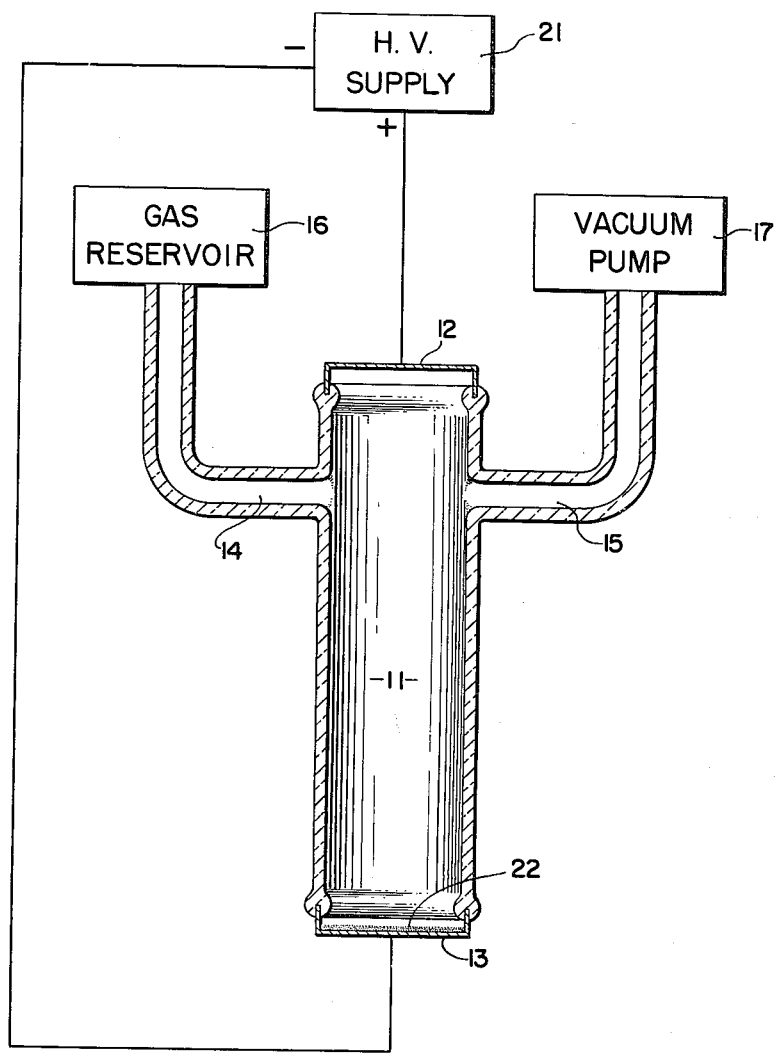

2,986,441

NEUTRON GENERATOR TARGETS

Alexander Thomas, Weston, and Joseph C. Drobinski, Jr., Beverly, Mass., assignors to Tracerlab, Inc., Waltham, Mass., a corporation of Massachusetts Filed Mar. 17, 1958, Ser. No. 721,779

7 Claims. (Cl. 316—9)

The present invention relates in general to apparatus for producing neutrons and more particularly to techniques for producing target electrodes for neutron generators.

In neutron generating tubes, as for example, that described in the copending application of C. W. Tittle, Serial No. 673,044, filed July 19, 1957, ions of deuterium or tritium are accelerated to a target electrode containing a hydrogen isotope, where neutrons are produced by interaction of the accelerated ions with the nuclei of the hydrogen isotope. The number of neutrons produced will depend on the intensity and energy of the incident ion beam, on the relative abundance of hydrogen isotope in the target, and on the losses due to absorption or scattering by any nuclei other than the hydrogen isotopes that are present in the target.

One of the factors limiting the intensity of the ion beam is the heat characteristic of the target, in that it must be kept below temperatures where the hydrogen isotope would tend to be released from the target material. Thus, a target structure capable of conducting the developed heat away from the target face is desirable, yet the same structure must be capable of mechanical strength and must lend itself to forming a glass to metal seal. Broadly speaking, then the problem is one of preparing a target which will have the desired properties of high hydrogen isotope abundance and yet meet these structural requirements.

In the past, two general classes of target materials have been used, the first being a deuterated paraffin wax and the other being deuterided or tritided zirconium or similar metal laminated to a tungsten or other structurally suitable base. Deuterided or tritided wax targets have not been satisfactory in that the hydrogen isotope concentration is very sensitive to changes of temperature and the targets have poor heat conductivity; hence, require elaborate cooling measures in order to obtain reasonable neutron producing efficiency. Because of poor heat conductivity, particularly at the interfaces, many laminated structures do not permit operation at reasonable target temperature without complex cooling apparatus.

The present invention contemplates and has as its primary object the provision of a method for preparing a target electrode for neutron generator tubes having improved characteristics of neutron efficiency, heat stability, and structural suitability.

Another object of this invention is to provide a method for coating a Kovar or similar metal target structure with an adherent layer of lithium deuteride or lithium tritide.

In one aspect of the present invention the target electrode, which is the base for the target coating, is first prepared by thorough chemical cleansing within the neutron generator tube. Thereafter, a hydrogen isotope gas is introduced into the tube which is then elevated to a high temperature, cooled and evacuated to displace undesirable gaseous elements adsorbed in the electrode surface. Crystals such as lithium deuteride are introduced in an inert gaseous atmosphere. The inert gas is pumped out and replaced with hydrogen isotope. The crystals are then melted into an adherent coating on the target electrode.

Other features and objects of the present invention will become apparent from the following detailed description when considered in conjunction with the accompanying drawing, the single figure of which illustrates a typical neutron generator tube embodying a target electrode prepared in accordance with this invention.

With reference now to the drawing, the neutron generator is seen to comprise a generally cylindrical glass envelope 11 capped at both ends by conductive metal electrode cups 12 and 13 hermetically sealed to the glass in the conventional manner. A pair of small tubes 14 and 15 communicate with the interior of envelope 11 and furnish the means for connecting a gas reservoir 16 and a vacuum pump 17, respectively. Operating potentials in the polarity indicated are applied to electrode 12 and 13 by high voltage power supply 21.

Electrodes 12 and 13 are metal for electrical conductivity, and preferably are formed of Kovar which is particularly satisfactory since it is readily sealed to the glass envelope 11, and also since it is capable of withstanding the extremes of temperature encountered in operation. In preparing the inner surface of Kovar cup electrode 13 for use as a target, the following procedure is followed. The envelope 11 is filled with a solution of concentrated hydrochloric acid and approximately 3% nitric acid so that electrode 13 is completely immersed in the solution which is then heated approximately to its boiling point. The acid solution is removed and the tube rinsed with distilled $H_2O$ to complete the cleansing process.

The tube is then evacuated and heated thoroughly to the point where after cooling and without pumping the internal pressure does not rise to higher than $5 \times 10^{-3}$ mm. Hg pressure in fifteen minutes. Thereafter, the envelope is filled to a pressure of approximately one atmosphere of deuterium and heated to a temperature between 600° C. and 700° C. In this manner deuterium reduces oxides and displaces undesirable gaseous elements adsorbed in electrode 13.

At this point, envelope 11 is evacuated while maintaining the target electrode temperature at 600–700° C., where after cooling and without pumping the internal pressure does not rise higher than $2 \times 10^{-3}$ mm. Hg pressure in fifteen minutes. Then, at room temperature the envelope is filled to approximately one atmosphere of dry inert gas, such as pure argon, and using argon as a flush, lithium deuteride crystals are deposited (through either tube 14 or 15) in Kovar electrode 13, a typical quantity being 38 milligrams per square centimeter of horizontal surface area. The argon is then evacuated from the envelope, and deuterium gas, at a pressure ranging from a few cm. Hg to two atmospheres (the optimum pressure is such that it will be greater than the dissociation pressure of lithium deuteride at all temperatures up to 686° C.), is introduced into the envelope. Electrode 13 is heated to the melting point of lithium deuteride crystals, which is 686° C., and then cooled to complete the process.

By use of the above described technique, a coating 22 of lithium deuteride is obtained on the inner flat surface of electrode 13. Excellent heat conductivity is thus achieved because of the intimate bonding of the lithium deuteride coating 22 to the Kovar electrode 13.

Lithium deuteride represents a high efficiency surface for neutron production because of the relatively high abundance of deuterium molecules. The Kovar is not only mechanically strong but as earlier noted also provides one of the most common and efficient metals for making glass to metal seals.

The same advantages are available with a target coating of lithium tritide, but the coating process is modified somewhat. In this case the cleaning and degassing procedures as outlined above for lithium deuteride are repeated. Thereafter, however, the process steps include the following:

Using an argon flush, lithium hydride crystals are deposited in Kovar electrode 13, an exemplary amount again being 38 milligrams per square centimeter of surface area. The argon is evacuated from envelope 11, and Kovar electrode 13 is heated to the melting point of the crystals, namely 680° C., under vacuum pumping, to remove the hydrogen molecules from the lithium hydride. The temperature is lowered during this process in order to avoid evaporating the partially hydrided lithium metal.

Tritium gas is then introduced into the envelope and the temperature brought back to 680° C. for maximum tritiding at a pressure ranging from a few centimeters to two atmospheres (again the optimum is such that the pressure will be maintained higher than the dissociation pressure of lithium tritide) and this atmosphere is maintained until the target has cooled to room temperature to yield an adherent coating 22 of lithium tritide.

By following either of the foregoing procedures, a target electrode is obtained which exhibits the desired high efficiency insofar as neutron yield is concerned, while exhibiting the durable structural characteristics required to withstand the most severe operating conditions.

Since numerous modifications may now be made by those skilled in the art, the invention herein is to be construed as limited only by the spirit and scope of the appended claims.

What is claimed is:

1. The method of preparing a metallic target electrode for a neutron generator comprising the steps of chemically cleansing said metallic electrode, depositing a layer of lithium deuteride crystals on said cleansed metallic surface in an atmosphere of dry inert gas, substituting an isotopic hydrogen atmosphere for said inert gas, and heating said metallic electrode to a temperature sufficient to melt said crystals into an adherent coating, said isotopic hydrogen atmosphere being maintained at a pressure greater than the dissociation pressure of the isotopic hydride of lithium formed as said coating at said temperature.

2. The method of preparing a metallic Kovar target electrode for a neutron generator comprising the steps of chemically cleansing a surface of said Kovar electrode, depositing a layer of lithium deuteride crystals on said cleansed Kovar surface in an atmosphere of dry inert gas, substituting an atmosphere of deuterium for said inert gas, and heating said surface in said deuterium atmosphere to the melting point of said crystals.

3. The method of preparing a metallic Kovar target electrode for a neutron generator comprising the steps of chemically cleansing a surface of said Kovar electrode, heating said cleansed Kovar surface in a deuterium atmosphere, evacuating said deuterium atmosphere, depositing a layer of lithium deuteride crystals on said cleansed Kovar surface in an atmosphere of dry inert gas, substituting an atmosphere of deuterium for said inert gas, and heating said surface in said deuterium atmosphere to the melting point of said crystals.

4. The method of preparing a target in a neutron generator tube having an envelope and opposed Kovar electrodes comprising the steps of filling said tube with a chemical cleansing agent, rinsing said agent, filling said tube with an atmosphere of deuterium, heating said tube containing an atmosphere of deuterium, evacuating said deuterium atmosphere, cooling said tube and substituting an atmosphere of dry inert gas for said deuterium, depositing a layer of lithium deuteride crystals on the inner surface of one of said Kovar electrodes, substituting an atmosphere of deuterium for said inert gas, and heating said last mentioned Kovar electrode in said deuterium atmosphere to the melting point of said crystals.

5. The method of preparing a metallic target electrode for a neutron generator comprising the steps of chemically cleansing said metallic electrode, depositing a layer of lithium hydride crystals on said cleansed metallic surface in an atmosphere of dry inert gas, evacuating said dry inert gas and heating said electrode under vacuum to the melting point of said crystals to remove most of the hydrogen molecules therefrom, lowering the temperature, immersing said partially hydrided lithium metal in a tritium atmosphere, raising the temperature sufficient for maximum tritiding, and cooling said electrode and crystals in said tritium atmosphere.

6. The method of preparing a metallic Kovar electrode for a neutron generator comprising the steps of chemically cleansing a surface of said Kovar electrode, maintaining an atmosphere of deuterium in contact with said cleansed Kovar surface, heating said Kovar surface in said deuterium atmosphere, evacuating said deuterium atmosphere, depositing a layer of lithium hydride crystals on said cleansed Kovar surface in an atmosphere of dry inert gas, evacuating said dry inert gas and heating said Kovar electrode under vacuum to the melting point of said crystals to remove most of the hydrogen molecules therefrom, lowering the temperature, immersing said partially hydrided lithium metal in a tritium atmosphere, raising the temperature sufficient for maximum tritiding, and cooling said Kovar electrode and said crystals in said tritium atmosphere to yield an adherent layer of lithium tritide.

7. The method of preparing a target in a neutron generator tube having an envelope and opposed Kovar electrodes comprising the steps of filling said tube with a chemical cleansing agent, rinsing said agent, filling said tube with an atmosphere of deuterium, heating said tube filled with deuterium, cooling said tube, substituting an atmosphere of dry inert gas for said deuterium, depositing a layer of lithium hydride crystals on the inner surface of one of said Kovar electrodes, evacuating said inert atmosphere, heating said last mentioned Kovar electrode and said crystals under vacuum to remove most of the hydrogen molecules therefrom, filling said envelope with an atmosphere of tritium, raising the temperature sufficient for maximum tritiding, and cooling said Kovar electrode and said crystals in said tritium atmosphere to yield an adherent layer of lithium tritide.

References Cited in the file of this patent

UNITED STATES PATENTS

| | | |
|---|---|---|
| 2,204,252 | Krenzien | June 11, 1940 |
| 2,510,071 | Chester | June 6, 1950 |
| 2,712,081 | Fearon et al. | June 28, 1955 |
| 2,816,242 | Goodman | Dec. 10, 1957 |

OTHER REFERENCES

KAPL-1667, The Lithium Hydride, Deuteride and Tritide Systems, Dec. 1, 1956, Knolls Atomic Power Laboratory, Schenectady, N.Y., by Hermann et al., pages 12–17, 42–44.

NYO-3957, A Survey Report on Lithium Hydride by Gibb, May 2, 1954, U.S. Atomic Energy Commission, pages 1–6, 14–17, 26, 27.